United States Patent Office 3,314,754
Patented Apr. 18, 1967

3,314,754
PRODUCTION OF ISOCYANIC ACID BY
PYROLYSIS OF ALKYL CARBAMATES
John J. Godfrey, Silver Spring, Md., assignor to W. R. Grace & Co., a corporation of Connecticut
No Drawing. Filed Nov. 29, 1963, Ser. No. 327,123
3 Claims. (Cl. 23—151)

The present invention relates to the production of isocyanic acid, and more specifically to an improved method by which good yields of isocyanic acid may be obtained by the pyrolysis of alkyl carbamates.

It is known that when alkyl carbamates are heated in the liquid phase at temperatures in the order of 400° C., a pyrolysis occurs which yields small amounts of isocyanic acid. This production of isocyanic acid is accompanied by considerable decomposition, charring, and the formation of condensation products. Hence, to date the production of isocyanic acid by the pyrolysis of alkyl carbamates has not proven to be a commercially successful route.

It is therefore an object of the present invention to provide an improved method for producing isocyanic acid from alkyl carbamates.

It is another object to provide a method for pyrolyzing alkyl carbamates to obtain isocyanic acid which is not accompanied by the formation of undesired extraneous reaction products.

These, and still further objects of the present invention will become readily apparent to one skilled in the art from the following detailed description and specific examples.

Broadly, the present invention contemplates a method for producing isocyanic acid which comprises heating a lower alkyl carbamate in the vapor phase at elevated temperatures to obtain a mixture of isocyanic acid and a lower alkanol, and immediately after pyrolysis, cooling the pyrolysate to a temperature below about 0° C. and subsequently isolating the isocyanic acid from the reaction mixture by fractional distillation at temperatures below 0° C. under reduced pressure.

More specifically, I have found that if a lower alkyl carbamate of the formula

wherein R represents a lower alkyl radical having from about 1 to about 4 carbon atoms, is heated in the vapor phase to a temperature of from about 350° to about 450° C., a reaction takes place wherein a substantially uncontaminated mixture of isocyanic acid and corresponding lower alkanol is formed. This mixture is then immediately cooled below about 0° C. to prevent spontaneous polymerization of the isocyanic acid to cyanuric acid, cyamelide and other condensation products. Subsequent to cooling below about 0° C. the isocyanic acid which has a boiling point of about 0° under a reduced pressure of about 200 mm. Hg may be cleanly and effectively removed from the reaction mixture. Isocyanic acid is much lower boiling than methanol, the lowest member of the series of alkanols which may be used. The alkanol and any non-reacted alkyl carbamate which remains in the reaction mixture may be separated by conventional means. The non-reacted alkyl carbamate is then recycled back to the beginning of the process and the alkanol may be utilized as a useful side reaction product. For instance, the lower alkanol may be reacted with urea to form additional alkyl carbamate for use in the present process.

In the event the lower alkanol is used to produce more alkyl carbamate by reaction with urea a cyclic process results wherein urea is the basic raw ingredient and ammonia which results in the reaction of urea with lower alkanol is substantially the only non-utilized product. This ammonia, of course, may be cycled back to a process wherein urea is manufactured. The overall reactions which occur in such process are outlined below:

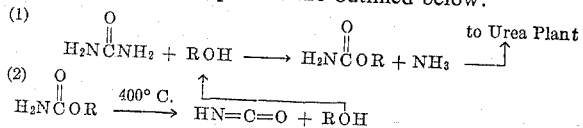

The above reaction occurs substantially without the formation of decomposition and/or condensation products provided the pyrolysis temperature is maintained in the range of from about 350° to about 450° C. Furthermore, the reactants must be maintained in the vapor phase at the aforementioned temperatures up to the time they are cooled to below about 0° C. The mixture which results from the pyrolysis consists essentially of isocyanic acid, alkanol, and varying amounts of alkyl carbamate. If this pyrolysate is cooled below about 0° C. immediately after pyrolysis takes place no undesired polymerization to cyanuric acid and other products takes place.

As mentioned above, alkyl carbamates which may be treated in accordance with the present invention have the general formula:

$$\mathrm{H_2N\overset{O}{\overset{\|}{C}}OR}$$

wherein, R represents normal alkyl radicals having from about 1 to about 4 carbon atoms. Certain alkyl carbamates such as tertiary butyl carbamates which favor a competing elimination reaction for the formation of an olefin and carbamic acid are not suitable for the practice of the present invention. Otherwise, all alkyl carbamates which do not undergo this elimination reaction are suitable.

The temperatures which are used in the present pyrolysis range from about 350° to about 450° C. Temperatures much below about 350° C. produce little or no isocyanic acid in a reasonable amount of time. On the other hand, temperatures in excess of about 450° C. produce considerable amount of undesired decomposition. Using temperatures falling within the 350° to 450° C. temperature range, it is found that pyrolysis to the desired isocyanic acid-alkanol mixture takes place practically instantaneously. Residence of the alkyl carbamate in the pyrolyzation zone on the order of from about 1 to about 10 seconds however, may prove beneficial in that during this period of time complete heating of the alkyl carbamate may take place.

The apparatus which is used to conduct the present pyrolysis may take any form known to those skilled in the art. A typical apparatus which is suitable for practicing the present invention may comprise an alkyl carbamate vaporization chamber directly connected to an extended pyrolysis zone, which may comprise an elongated tube heated to the desired temperature. The pyrolyzation tube is then connected to a cooling means wherein the pyrolysate issuing therefrom may be quickly quenched, i.e. cooled, to a temperature of below about 0° C. One particularly good method is mixing of hot pyrolysate stream with a cold stream of inert gas, such as $N_2$, to quench. The pyrolysate after being condensed is then conducted to a suitable fractionation apparatus which is capable of distilling the isocyanic acid from the reaction mixture at temperatures in the order of from about −40° to about 0° C. at pressures ranging from about 0 mm. to about 200 millimeters of mercury. In operation, the alkyl carbamate vaporization chamber is maintained at a temperature well above the boiling point of the alkyl carbamate to flash vaporize the alkyl carbamate essentially instantaneously. This vapor, preferably but not necessarily, with the aid of sweep gas which may be passed through the vaporization zone, is conducted directly into the pyrolysis tube maintained at a temperature of from 350° to 450° C. by means of a suitable heating device. As the pyrolysate emerges from the pyrolyzation tube, it may conveniently be cooled in a Dry Ice trap, and then fractionated under reduced pressure in a conventional manner, preferably continuously so as to minimize the contact time of alkanol with isocyanic acid.

The liquid pyrolysate which is produced by the present invention, contains about equimolar amounts of alkanol and isocyanic acid depending on the precise pyrolysis temperature used, and the residence time of the alkyl carbamate in the pyrolysis zone. As mentioned previously, substantially no side products are present in the pyrolysate. The solid portion of the pyrolysate consisting primarily of non-reacted alkyl carbamate may be conveniently re-cycled through the initial pyrolysis process. Furthermore, the alkanol may be reacted with urea to form additional alkyl carbamates using reaction methods and conditions well known to those skilled in the art.

Having described the basic aspects of the present invention, the following example is given to illustrate embodiments thereof.

Example

Molten methyl carbamate maintained at a temperature of about 60° C. was pumped into a 1/8 inch outside diameter stainless steel, type 304 tubing maintained at a temperature of 400° C. This tubing extended two feet inside an oven, and was connected to a ten foot 1/4 inch outside diameter, type 304 stainless steel tubing, by means of a T fitting. The 1/8 inch outside diameter tubing served as a vaporizer for the methyl carbamate. Also entering the pyrolysis tube at the T fitting was a stream of preheated nitrogen which served to conduct the pyrolysis mixture through the pyrolysis tube. The pyrolysis tube contained a volume of about 40 milliliters and terminated at the oven wall into a 1/8 inch outside diameter stainless tube. This 1/8 inch tube passed into a Dry Ice trap which served to quench the pyrolysate quickly to a temperature below about 0° C.

To start up the pyrolysis apparatus, the oven was heated to temperature with a stream of nitrogen flowing through the pyrolysis tube. After the system had been heated to the desired temperature, methyl carbamate was fed at a rate of about 5 grams per minute into the vaporizing tube. The flow of inert gas was then adjusted to give the desired residence time. The liquid portion of the pyrolysate mixture, which was collected in the Dry Ice trap, was fractionated at a temperature of from about −40 to about −20° C. under reduced pressure to obtain overhead the isocyanic acid. One part isocyanic acid is obtained from about 2.5 parts liquid pyrolysate; any solid formed is recycled and reconverted to isocyanic acid. The remainder of the pyrolysate comprised primarily of non-reacted methyl carbamate was recycled through the apparatus, along with additional make-up methyl carbamate.

The above specific example illustrates that isocyanic acid may be efficiently and conveniently prepared by pyrolysis in the vapor phase. The pyrolysate which results from this process comprises an easily separable mixture of isocyanic acid, lower alkanol and non-reacted alkyl carbamate which may be quickly and easily separated. Substantially no alkyl carbamate is lost by formation of undesired condensation and degradation products.

I claim:
1. A method for producing isocyanic acid which comprises pyrolyzing a lower alkyl carbamate in the vapor phase at a temperature from about 350° to about 450° C., cooling the pyrolysate resulting from said pyrolysis to below about 0° C., and recovering isocyanic acid from said pyrolysate by fractional distillation at temperatures below about 0° C.

2. The method of claim 1, wherein said lower alkyl carbamate is methyl carbamate.

3. The method of claim 1, wherein non-converted lower alkyl carbamate is re-cycled through the pyrolysis step.

References Cited by the Examiner

FOREIGN PATENTS 1,328,696    4/1963    France.

OTHER REFERENCES

Beilstein: Organische Chemie, vol. III, pp. 15–16 (1929).

Conant: The Chemistry of Organic Compounds, Revised Edition, pp. 252–254 (1939), The Macmillan Company, New York.

Williams: Cyanogen Compounds. Their Chemistry, Detection and Estimation, Second Edition, pp. 48, 65 (1948), Edward Arnold & Company, London.

OSCAR R. VERTIZ, *Primary Examiner.*

H. S. MILLER, *Assistant Examiner.*